United States Patent [19]

Murphrey

[11] Patent Number: 5,263,437
[45] Date of Patent: Nov. 23, 1993

[54] SINGLE SOW HOG FEEDER

[76] Inventor: S. Bellmont Murphrey, P.O. Box 1525, Tarboro, N.C. 27886

[21] Appl. No.: 68,146

[22] Filed: May 28, 1993

[51] Int. Cl.$^5$ .............................................. A01K 5/00
[52] U.S. Cl. .................................... 119/53.5; 119/53; 119/902
[58] Field of Search ....................... 119/53.5, 53, 52.1, 119/52.4, 53, 57.91, 902

[56]  References Cited

U.S. PATENT DOCUMENTS

| | | | |
|---|---|---|---|
| 516,339 | 3/1894 | Wellsteed | 119/53.5 |
| 634,927 | 10/1899 | Wellsteed | 119/53.5 |
| 655,477 | 8/1900 | Combs | 119/53.5 |
| 4,889,078 | 12/1989 | Smiley | 119/53.5 |
| 5,044,318 | 9/1991 | Sutton et al. | 119/53 X |

FOREIGN PATENT DOCUMENTS 2042865 10/1980 United Kingdom .................. 119/53

Primary Examiner—John J. Wilson
Assistant Examiner—Thomas Price
Attorney, Agent, or Firm—Rhodes, Coats & Bennett

[57] ABSTRACT

The present invention relates to a hog feeder for one sow. The sow hog feeder comprises a circular trough that includes an agitating star wheel rotatably mounted in the bottom of the trough. A feeding tube is supported on a frame structure that extends upwardly from the round trough and receives and holds a feeding tube in an offset relationship with respect to the center of the round trough. The relationship of the offset feeding tube with respect to the agitating star wheel and round trough assures that hog feed is not wasted or caked around the sides of the container.

9 Claims, 4 Drawing Sheets

SINGLE SOW HOG FEEDER

FIELD OF INVENTION

The present invention relates to hog feeders and more particularly to a hog feeder designed to feed one sow.

BACKGROUND OF THE INVENTION

Typically, hog feeders that are designed for sows are designed with a trough and an upstanding feeding tube extending above the trough. These sow hog feeders are designed to be attached to a gate of a farrowing stall with the trough projecting through the gate into the stall while the feed tube is disposed on the outside of the gate. The major problems with sow feeders of the past is that they are designed such that the sow, during the feeding process, is able to waste tremendous amounts of food. It is not uncommon for sows to root within a trough filled substantially with food and to drop large quantities of feed outside of the trough and down through an open floor structure of the stall. The more food removed from the trough the more new feed that can be dispensed into the trough by the feed drop tube.

Another major problem with sow feeders of the past is that feed tends to become wet or moist and then cakes around the interior of the trough. This prevents feed from really being dispensed from the feed tube and again contributes to waste. Most importantly, the caking of feed in the trough requires that the hog feeders be cleaned often and this of course takes time and labor and thusly becomes expensive.

Therefore, there is a need and continues to be a need for a sow hog feeder that is designed to minimize waste and to avoid feed caking.

SUMMARY AND OBJECTS OF THE INVENTION

The present invention entails a sow feeder designed to feed a single sow which is designed to overcome the disadvantages and drawbacks of hog feeders of the prior art and is particularly designed to minimize feed waste and to avoid feed caking. The design of the sow hog feeder of the present invention entails a round trough having a centrally disposed agitating star wheel rotatively journaled to the center of the round trough. A drop feeding tube is offset with respect to the center of the round trough and is in fact designed and disposed such that a cylindrical wall thereof extends downwardly into tangential relationship with the outer round surrounding wall structure of the round trough. Thus, the feeder tube or drop tube dispenses food to an area radially spaced from the center of the round trough.

It is therefore an object of the present invention to provide a hog feeder that is designed specifically to feed a single sow.

Another object of the present invention is to provide a hog feeder that is designed to minimize waste and to avoid feed caking.

Another object of the present invention resides in the provision of a hog feeder where the drop feeder or feed tube is offset with respect to the center of a round trough such that the feed tube dispenses feed to an area of the round trough radially spaced from the center of the round trough.

Another object of the present invention is to provide a sow hog feeder for feeding a single sow that is designed to only dispense relatively small portions of feed to a round feed trough and thereafter to cease dispensing feed until the sow has consumed some of the feed thereby effectively maintaining a relatively small portion of feed in the trough.

Another object of the present invention resides in the provision of providing a round trough for a sow feeder that includes a centrally pivotally mounted agitating star wheel that includes a plurality of agitating fingers that project out to and terminate short of a surrounding circular wall and which is effective to break up caked feed.

Another object of the present invention resides in the provision of a sow hog feeder that is designed to be reliable and which is of a design that does not require frequent cleaning.

Still a further object of the present invention resides in the provision of a sow feeder having a straight wall feed tube that is free of any agitating equipment and thereby is designed so as to prevent clogging of feed within the feed drop tube due to an agitating bar or wedge.

Other objects and advantages of the present invention will become apparent and obvious from a study of the following description and the accompanying drawings which are merely illustrative of such invention.

DETAILED DESCRIPTION OF THE INVENTION

Figure 1:
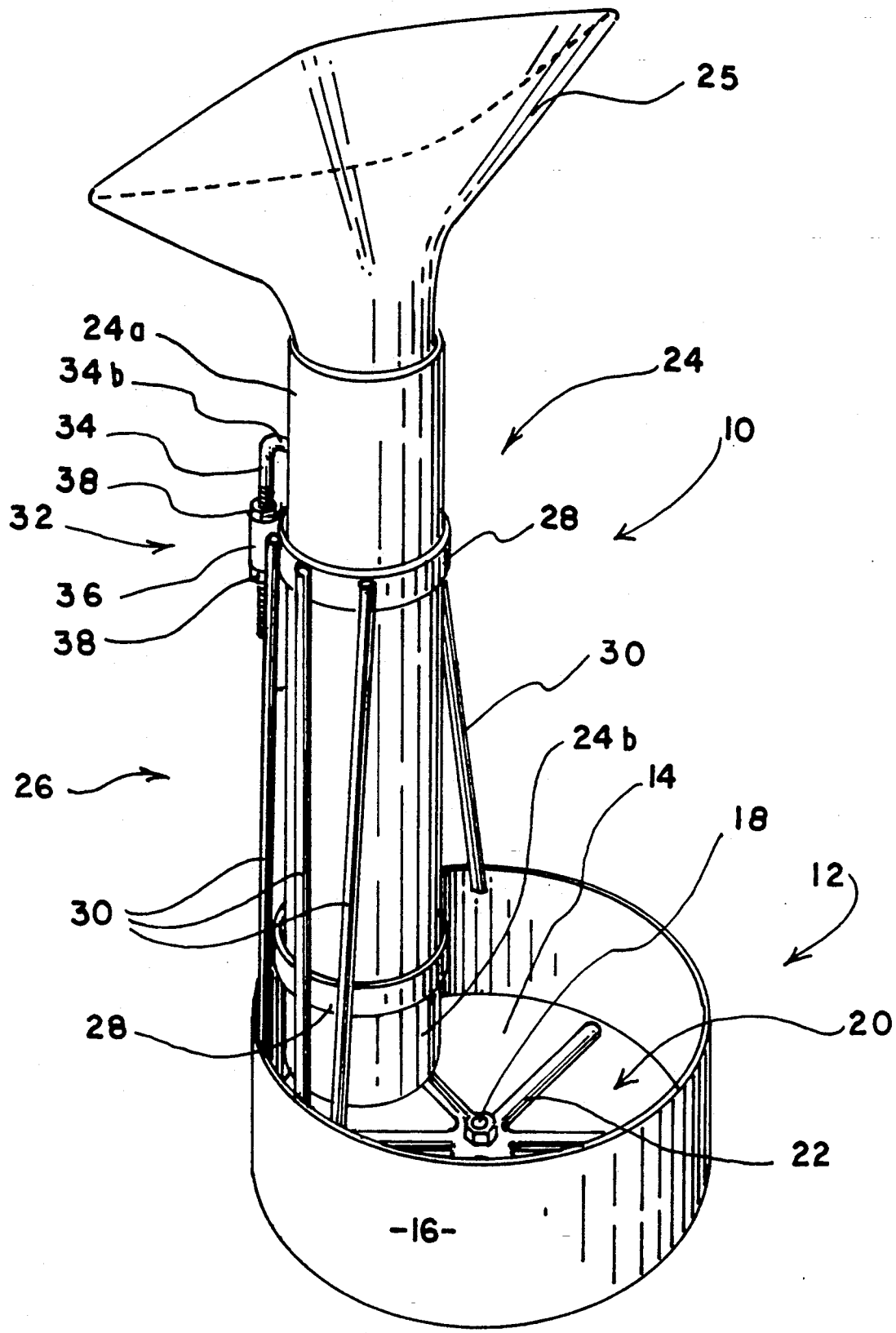
FIG. 1 is a perspective view of the hog feeder of the present invention.

With further reference to the drawings, the hog feeder of the present invention is shown therein and indicated generally by the numeral 10. As discussed above, hog feeder 10 is designed to be used by a single hog and particularly a sow. In use, the hog feeder 10 of the present invention is designed to fit within an opening of a gate that forms a part of a farrowing stall.

With particular reference to hog feeder 10, the same includes a round trough indicated generally by the numeral 12. Round trough 12 includes a flat bottom 14 having a circular and round side wall 16.

Disposed on the bottom 14 is an agitating star wheel indicated generally by the numeral 20. Star wheel 20 is pinned to bottom 14 via pivot pin 18 which effectively pivotally mounts the agitating star wheel 20 to the bottom 14. Star wheel 20 includes a plurality of radially projecting fingers 22 with each finger including an outer terminal end portion that terminates in close proximity to the surrounding circular side wall 18. In particular, the fingers 22 project almost to the wall but terminate short of the wall such that when the star wheel 20 is rotated by the rooting hog the agitating star wheel tends to break up the caked feed within the trough 12.

Disposed over the round feed trough 12 is a feed tube or drop tube indicated generally by the numeral 24. Feed tube 24 includes an open top portion 24a and an open bottom portion 24b. Feed tube 24 is of a straight wall construction and is preferably constructed of PVC pipe. There are no obstructions of any type within the feed tube 24 and consequently, feed is free to move downwardly through the tube 24 by the influence of gravity and is not obstructed by a bridge or agitating bar or the like. The top portion 24a of the feed tube 24 is designed to receive a funnel 25 that permits feed tube 24 to be filled easily.

Figure 2:
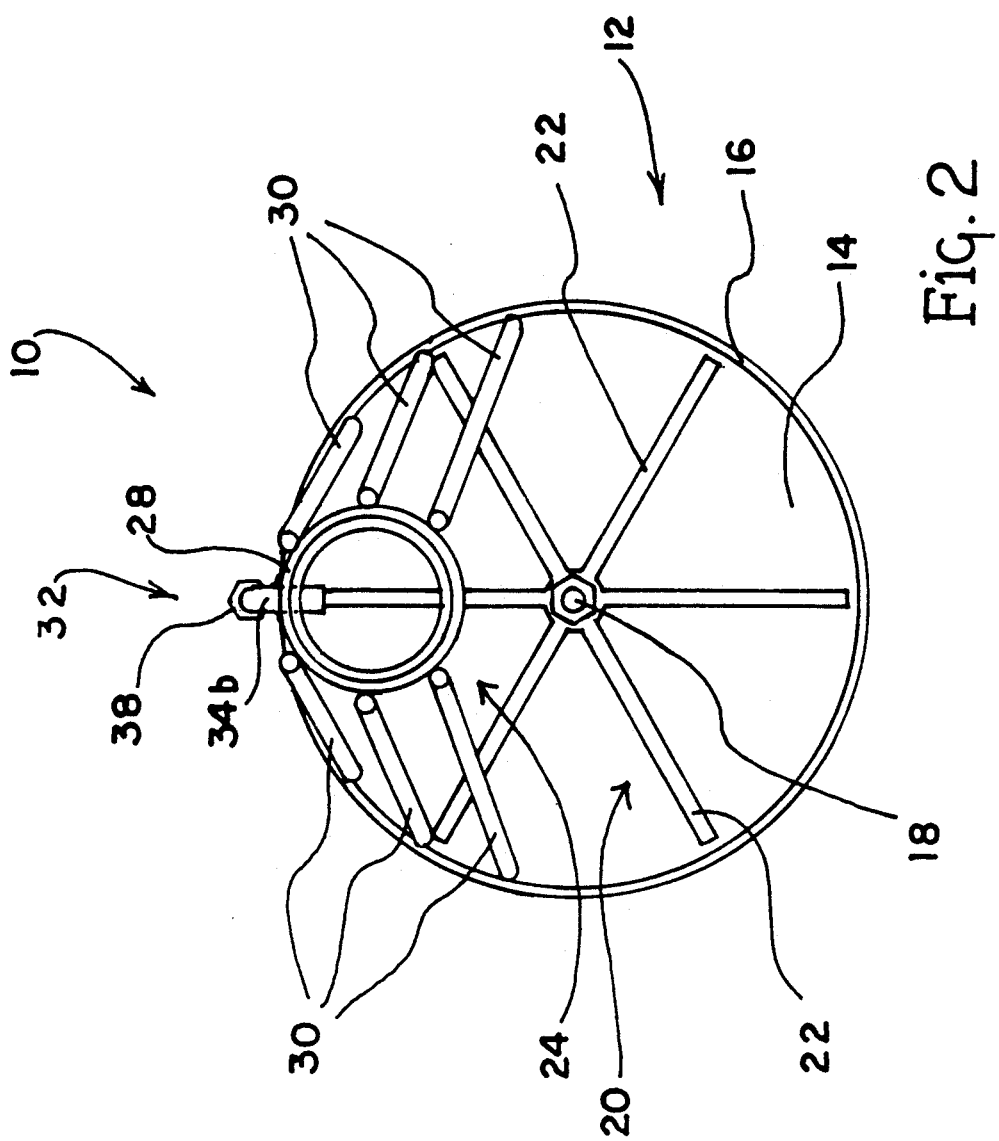
FIG. 2 is a top plan view of the hog feeder of the present invention.

As seen in the drawings, it is important that the feed tube be offset with respect to the center of the round trough 12. Note that the outermost portion of the wall structure of the feed tube 24 is disposed adjacent to the side wall 16 of the round trough. In fact, the outer portion of the cylindrical wall structure of the feed tube 24 is disposed generally tangential to the side wall 16. Consequently, the feed tube 24 dispenses feed to an area about the periphery of the round trough 12. For example, see FIG. 2 where the innermost side of the cylindrical wall of the feed tube 24 is radially spaced from the pivot pin 18 and the center of the round trough 12. This is an important point because the relationship of the feed tube 24, agitating star wheel 20, and the bottom 14 of the round trough 12 is important in controlling the quantity of hog feed dispensed at any one time.

To support the feed tube 24 there is provided a frame structure indicated generally by the numeral 26. Frame structure 26 includes a pair of vertically spaced rings 20. Supporting rings 20 is a series of spaced apart rods 30 that are fixed to side wall 16 and extend upwardly therefrom to where they connect with the rings 20. The outermost rods 30 extend directly to the upper ring 20 and connect thereto. Innermost rods 30 connect to both upper and lower rings 20.

Figure 3:
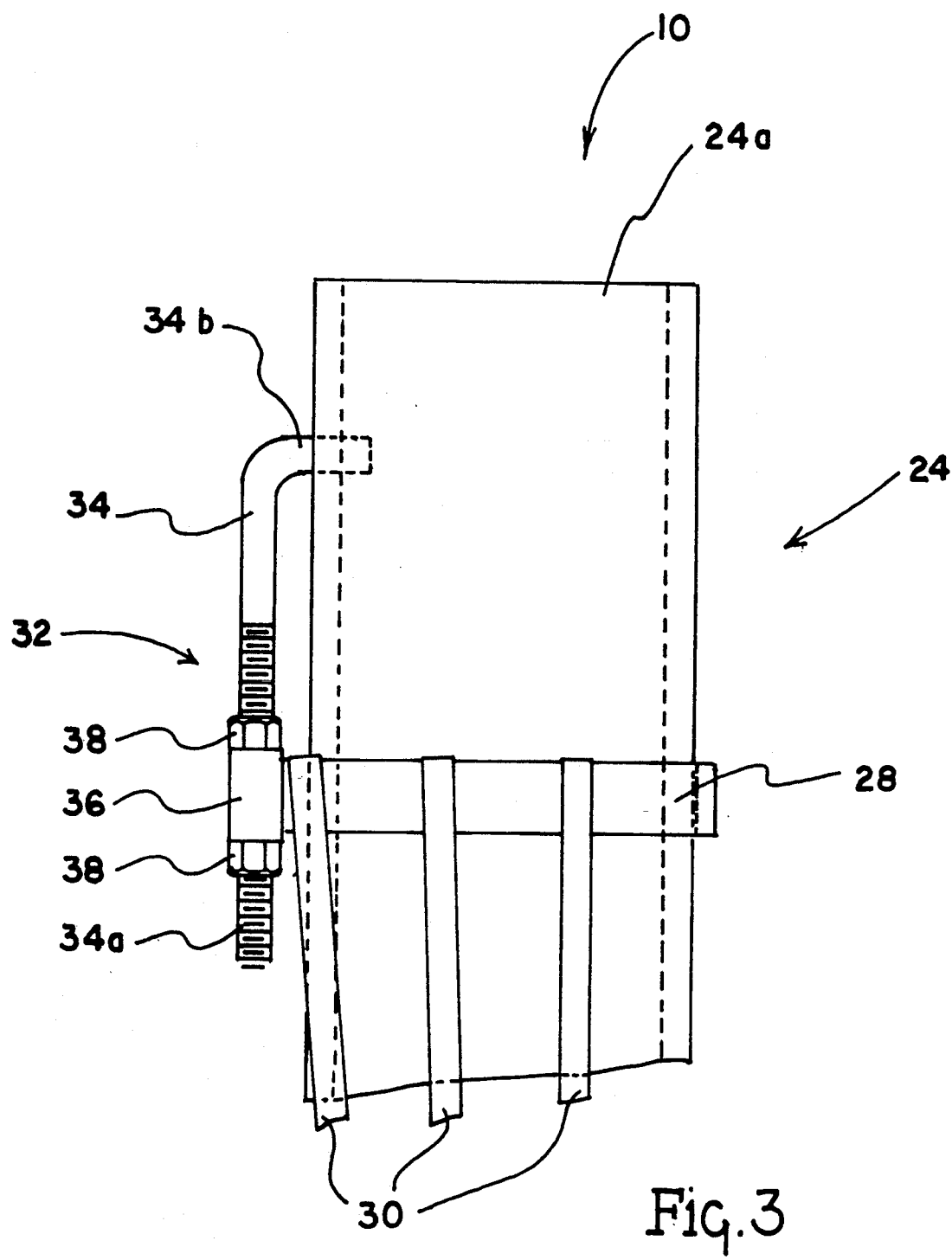
FIG. 3 is a fragmentary side elevational view of that portion of the hog feeder that effectuates the vertical adjustment of the feed tube.

It is important with the present hog feeder 10 to be able to vertically adjust the height of the same with respect to the trough 12. This will enable an operator to effectively adjust the quantity of feed dispensed at any one time. To accomplish this vertical adjustment the present invention is provided with a vertical adjustment mechanism indicated generally by the numeral 32. As particularly seen in FIG. 3, this vertical adjustment mechanism 32 includes a rod 34 having a lower threaded portion 34a and a bent finger 34b. The bent finger portion 34a of the rod 34 extends through an opening in the side wall of the feeding tube 24. A sleeve 36 is fixed to the frame structure 26 and particularly to the upper ring 28 and the threaded portion 34a of the rod 34 extends through the sleeve. A pair of nuts 38 are provided on each side of the sleeve 36 and threaded onto the threaded portion 34a and by selectively moving the nuts 38 on the threaded portion 34a, it is appreciated that the height of the drop tube can be adjusted.

Figure 4:
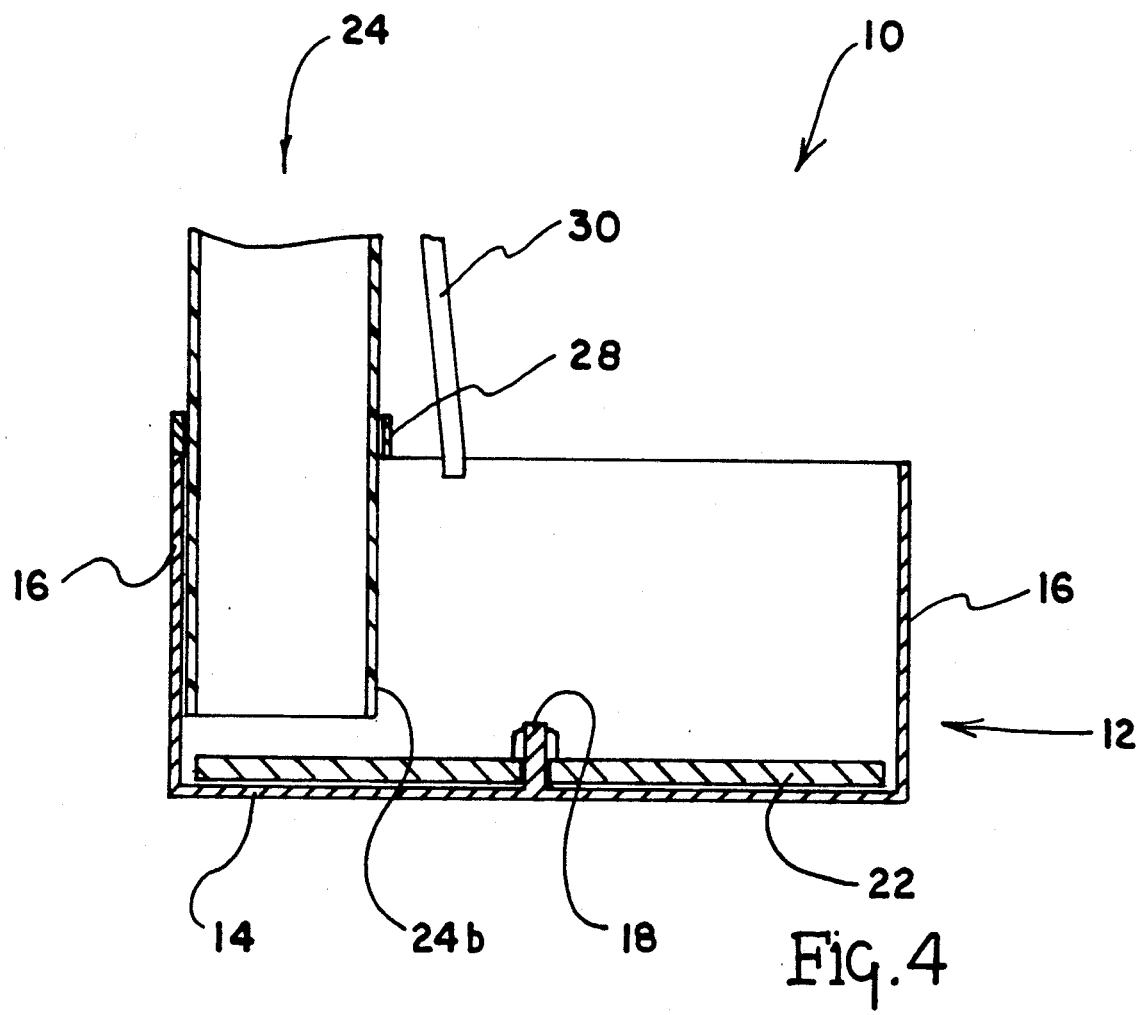
FIG. 4 is a fragmentary vertical cross-sectional view of the hog feeder of the present invention.

In operation, the operator adjusts the height of the drop tube or feed tube 24 such that the lower end of the tube is spaced just above the bottom 14 of the trough and just above the fingers 22 of the agitating star wheel 20. See FIG. 4. The hog feeder 10 of the present invention is designed such that a relatively small amount of feed is dispensed at any one time so as to require the sow to consume small portions of feed at a single time. This will prevent the sow from taking large mouthfuls of feed and wasting the feed outside of the trough 12. By the arrangement of the trough 12, agitating star wheel 20 and the drop tube 24, once a selected portion of feed has been dispensed out of the drop tube then the dispensing of feed will cease until at least some of the feed has been consumed by the sow. Expressed in another way, once a certain quantity of feed has been dispensed out the feed tube 24, then it becomes more difficult for the sow to root or drive the agitating star wheel 20 around the bottom of the round trough 12. The restriction caused by the feed against the star wheel effectively controls the dispensing of feed from the feed tube 24. But once the sow has consumed additional feed from the trough, then it becomes easier for the sow to root or move the star wheel 20 around the bottom which will again move feed from underneath the drop tube and free that area to receive additional feed from the feed drop tube 24. This is an important part of the present invention.

From the foregoing discussion, it is appreciated that the hog feeder 10 of the present invention will minimize feed waste as it will selectively control the dispensing of feed from the feed tube 24 into the round trough and will require the sow to consume small amounts of feed at any one time. Next, the relationship of the agitating star wheel 20 with respect to the bottom 14 and side wall 16 will result in the star wheel effectively breaking up caked feed and will accordingly solve that problem. Finally, the straight wall construction of the drop tube 24 itself will prevent feed from becoming jammed and clogged within the feed tube.

The hog feeder 10 of present invention is practical, easy to use and maintain and requires infrequent cleaning.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A single hog feeder designed to feed one hog at a time comprising:
    a) a round trough having a flat bottom and a round circular side wall;
    b) an agitating star wheel centrally mounted within the round trough for rotation therein;
    c) a pivot pin mounted in the center of the bottom of the trough and having the agitating star wheel rotatably mounted therearound such that the star wheel may rotate about the pivot pin;
    d) the agitating star wheel including a plurality of radially extending fingers that terminate just short of the round circular wall such that the fingers tend to break up caked feed as the wheel is rotated by a hog;
    e) an offset vertical feeding tube mounted between the vertical axis of the pivot pin and the circular wall of the trough such that the feeding tube dispenses feed to an area of the trough radially spaced from the pivot pin and adjacent the circular wall of the trough;
    f) a frame structure fixed to the trough and extending upwardly therefrom for receiving and supporting the feeding tube; and
    g) means for vertically adjusting the height of the vertical feeding tube with respect to the bottom of the trough and the agitating star wheel.

2. The single hog feeder of claim 1 wherein the feeding tube is of a straight wall construction and is totally open throughout such that the feed may drop therethrough without encountering obstructions such as an agitating bar within the drop tube itself.

3. The single hog feeder of claim 1 wherein the feeding tube is constructed of PVC material.

4. The single hog feeder of claim 1 wherein the feed tube comprises a cylindrical tube having a surrounding wall structure that is disposed adjacent and generally tangential to the surrounding circular wall structure of the trough and wherein the wall structure of the cylindrical feeding tube is spaced from the pivot pin such that feed is dispensed in an area radially spaced from the center of the trough.

5. The single hog feeder of claim wherein the feeder tube includes a lower terminal end wherein the vertical adjustment means maintains the lower terminal end of the feed tube spaced above the agitating star wheel and bottom of the trough such that only a limited quantity of feed can be dispensed into the trough at any one time thereby requiring that the hog consume a quantity of feed before additional feed is dispensed into the trough.

6. The single hog feeder of claim 1 wherein the frame structure for holding and supporting the feeding tube comprises a pair of vertically spaced rings through which the feeding tube passes, and a series of rods extending between the trough and the ring and wherein each rod includes an upper and lower end and wherein the lower end of respective rods are secured to the surrounding wall of the trough and extend upwardly therefrom where the top portion of the rods connect to the uppermost disposed ring.

7. The single hog feeder of claim 1 wherein the vertical adjustment means for adjusting the vertical height of the feeding tube with respect to the bottom of the trough includes a rod having a threaded portion and a turned lifting finger that projects into the feeding tube itself and a sleeve fixed to the frame structure that supports the feeding tube and wherein the threaded portion of the rod passes through the sleeve, and nut means threaded on the threaded portion of the rod for adjusting the position of the feeding tube with respect to the bottom of the trough.

8. The single hog feeder of claim 1 wherein the feeding tube is of a cylindrical construction and includes a cylindrical wall structure and wherein the outermost portion of the cylindrical wall structure of the feeding tube is disposed generally tangential to the surrounding circular wall structure of the trough and wherein the innermost portion of the surrounding wall structure is radially spaced substantially from the center of the round trough so as to leave a substantial open area between the feeding tube and the center of the trough.

9. The single hog feeder of claim 1 wherein the agitating star wheel is turned by the rooting action of a hog and sweeps and passes totally underneath the feeding tube and wherein the feeding tube and agitating star wheel are so arranged that a certain quantity of dispensed feed will effectively inhibit the hog from turning the agitating star wheel and will consequently cease the distribution of food from the feeding tube.

* * * * *